US007478107B1

(12) United States Patent
Yehuda

(10) Patent No.: US 7,478,107 B1
(45) Date of Patent: Jan. 13, 2009

(54) METHODS AND APPARATUS FACILITATING MANAGEMENT OF A SAN

(75) Inventor: Hanna Yehuda, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 301 days.

(21) Appl. No.: 11/021,565

(22) Filed: Dec. 23, 2004

(51) Int. Cl.
G06F 17/00 (2006.01)
G06F 7/00 (2006.01)
(52) U.S. Cl. ...................... 707/103 X; 707/10; 715/737
(58) Field of Classification Search ............... 707/1–10, 707/100–104.1, 200–206; 709/217, 219; 715/734–739, 771, 773
See application file for complete search history.

(56) References Cited

U.S. PATENT DOCUMENTS

| | | | | |
|---|---|---|---|---|
| 6,636,239 B1 * | 10/2003 | Arquie et al. | ............... | 715/736 |
| 6,839,747 B1 * | 1/2005 | Blumenau et al. | ........... | 709/223 |
| 6,966,033 B1 * | 11/2005 | Gasser et al. | ............... | 715/738 |
| 7,032,186 B1 * | 4/2006 | Gasser et al. | ............... | 715/853 |

OTHER PUBLICATIONS

Shing Hung Chang et al., On the inter-dependency of interactive multimedia protocol and network architecture, Dec. 2-4, 1997, IEEE, 284-287.*
Tierney et al., A network-aware distributed storage cache for data intensive environments, Aug. 3-6, 1999, IEEE, 185-193.*

* cited by examiner

Primary Examiner—Jean B Fleurantin
(74) Attorney, Agent, or Firm—Chapin IP Law, LLC; Barry W. Chapin, Esq.

(57) ABSTRACT

A resource manager generates a graphical user interface that enables a user to manage a configuration of the storage area network via a guided mode in which a graphical user interface displays a set of automatically generated operations to be performed by the user to execute a storage area network management function. The resource manager also can generate a graphical user interface also enables the user to manage configuration of the storage area network via an interactive mode in which the graphical user interface enables the user free navigation amongst storage area network resources and initiation of user-generated operations on the resources to execute the storage area network management function. In furtherance of executing the management function, the resource manager preserves state information of performed operations associated with the management function while the user switches between the guided mode and the interactive mode of the graphical user interface.

27 Claims, 11 Drawing Sheets

METHODS AND APPARATUS FACILITATING MANAGEMENT OF A SAN

RELATED APPLICATION

This application is related to co-pending application entitled "METHODS AND APPARATUS FOR GUIDING A USER THROUGH A SAN MANAGEMENT PROCESS," by Hanna Yehuda and Morrie Gasser, Ser. No. 11/021,107, the entire teachings of which are incorporated herein by this reference.

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Data storage system developers have responded to the increased need for storage by integrating high capacity data storage systems, data communications devices (e.g., switches), and computer systems (e.g., host computers or servers) into networks called "storage networks" or "Storage Area Networks" (SANs).

In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer accesses a large repository of storage through the switching fabric on behalf of the requesting client. Thus, a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, conventional network management storage applications generate a graphical user interface utilized by a network manager to graphically select, interact with, and manage local or remote devices and associated software processes associated with the storage area network.

Based on use of the graphical user interface in combination with an input device such as a hand operated mouse and corresponding pointer displayed on a viewing screen, a network manager can "click" using a mouse to manage hardware and software entities such as file systems, databases, storage devices, peripherals, network data communications devices, etc., associated with the storage area network. In some storage area networks, a network management station and associated management software allows a network administrator or systems manager (a person responsible for managing the storage network) to allocate and deallocate resources (e.g., hardware and software resources) in a storage area network. Consequently, the network manager can reconfigure a SAN according to users' present needs.

The infrastructure required to support access to data in a storage area network can be quite complex. As an example, consider the number of hardware and software components that must work in harmony in order for a user's software application executing on a host computer system to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests.

The operating system on the host computer system then transmits the I/O requests through a host interface device resource, such as an interface card ((e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed via the storage devices, I/O responses are returned to the user application along an information or data flow path based on operations and processing functionality provided by each of the aforementioned components and resources in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

SUMMARY

Management of a storage area network can be a challenge due to the complex network of resources in the storage area network that must be configured so that the storage area network operates properly. For example, as discussed, resources in a storage area network typically include a multitude of storage area network resources (such as those in a path between a host resource and storage array) working in harmony so that a host resource of the storage area network can access data on behalf of requesting clients. In certain cases, when even a single resource in the storage area network is not properly configured in a chain of resources, a client in communication with a host resource of the storage area network may not be able to access data in the storage area network.

Network managers that manage the network and corresponding resources can range from inexperienced users who have a rudimentary understanding of how to configure a storage area network to experienced users who perform such tasks on a daily basis. Thus, network manager software applications for managing the storage area network preferably cater to a wide range of network managers having different levels of experience.

The description below includes several useful examples of at least partially guiding a user through a management process while also enabling the user to freely navigate amongst storage area network resources and initiate operations in furtherance of executing a management function such as configuration of the storage area network. Certain techniques herein simplify the management process so that a user (e.g., an inexperienced network administrator) is less likely to make mistakes during a configuration or reconfiguration of the storage area network. Reducing a number of mistakes made during configuration/reconfiguration reduces "down time" of the storage area network and time otherwise required to fix configuration errors made by a network administrator. Increased "up time" of the storage area network means that clients will be more likely able to successfully access data in the storage area network at any given time.

More specifically, configurations of the present application include methods and apparatuses facilitating management of a storage area network. As an example, according to one configuration, a resource manager (e.g., a network manager software application) generates a graphical user interface that enables a user to manage a configuration of the storage area network via a guided mode in which a graphical user interface displays, to the user, a set of automatically generated operations to be performed by the user to execute a storage area network management function. The resource manager can generate a graphical user interface that enables the user to manage configuration of the storage area network via an interactive mode in which the graphical user interface enables the user free navigation amongst storage area network resources and initiation of user-generated operations on the storage area network resources to execute the storage area network management function. In furtherance of executing the management function, the resource manager preserves state information of performed operations associated with the storage area network management function while the user switches between the guided mode and the interactive mode of the graphical user interface. Consequently, a user can perform a portion of operations in the guided mode and a portion of operations in an interactive mode to execute a corresponding management function without losing results of operations performed in either mode.

According to further embodiments, while in the guided mode in which a graphical user interface displays (to the user) a set of automatically generated operations to be performed by the user to execute a storage area network management function, the resource manager processes input from the user to complete at least one operation of a predefined set of automatically generated operations in furtherance of executing the management function. During the process of completing an operation associated with the management function, e.g., in the guided mode, the resource manager generates state information associated with the at least one operation. In a specific case, the management function may be an ADD storage function that includes an operation such as an associated mapping operation. In this case, the resource manager preserves state information (e.g., results) of a completed mapping operation in the guided mode so that the state information can be used in the interactive mode. While in the interactive mode in which the graphical user interface enables the user free navigation amongst storage area network resources and initiation of user-generated operations on the storage area network resources to execute the storage area network management function, the resource manager can, on demand, display preserved state information associated with the mapping operation associated with the ADD storage management function. Further, via the interactive mode, the resource manager enables the user to modify the preserved state information associated with already completed and yet to be completed operations associated with a management function based on free navigation amongst storage area network resources and initiation of user-generated operations on the storage area network resources. The user also has an option of fully or partially executing (e.g., carrying out) a management function while in either the guided mode or the interactive mode, or both. The guided mode may be preferred by a user that has less experience because, in the guided mode, the user is prompted by the resource manager to provide appropriate input at stages of the management function. The interactive mode may be preferred in cases in which a user has more experience and desires freer navigation among storage area network resources and utilization of configuration tools to execute a management function and configure the storage area network.

In one application, the resource manager presents the user with selectable options in the interactive mode for viewing state information of one or more operations associated with the storage area network management function performed in the guided mode. For example, one selectable option of the interactive mode enables the user to view state information in a "properties" view mode option in which the graphical user interface provides a display of property information pertaining to a resource associated with an operation previously performed in the guided mode. Another selectable option in the interactive mode enables the user to view state information in a "topology" view mode option in which the graphical user interface provides a topology display view of a resource associated with an operation performed in the guided mode in relation to other storage area network resources. Viewing in the different viewing modes enables the user to detect whether the storage area network is being properly configured.

In addition to presenting a user with at least a partial list of completed operations associated with the management function performed in the guided mode but viewed in the interactive mode, as discussed, the resource manager supports flexibility in the interactive mode to execute the management function. For example, while in the interactive mode, the resource manager can provide a hierarchical arrangement of icons in relation to a completed operation associated with the management function. One or more of the icons in the hierarchy can be highlighted to indicate which resource in the storage area network the management function pertains. The resource manager enables the user to select a resource from the hierarchal arrangement of icons and perform user-generated operations on the selected resource in furtherance of executing the management function. Accordingly, when executing a management function having multiple associated operations, the resource manager provides a flexible way for a user to perform operations associated with the management function. For example, the resource manager enables the user to utilize both a guided mode and interactive mode of a graphical user interface to configure a storage area network.

As discussed, techniques herein are well suited for use in applications such as management of storage area networks and specific applications as discussed herein. However, it should be noted that configurations herein are not limited to use in such applications and thus configurations herein and deviations thereof are well suited for other applications as well.

Other examples of the present application include a computerized device (e.g., a host computer, workstation, etc.) configured to support the aforementioned method operations disclosed herein as embodiments of the present application to facilitate execution of a management function for configuring a storage area network. In such embodiments, the computerized device such as a management control center includes a memory system, a processor (e.g., a processing device), a display, and an interconnect. The interconnect supports communications among the display, the processor, and the memory system. The memory system is encoded with an application that, when executed on the processor, produces a process that enables the user to configure a storage area network.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate execution of a management function as explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular embodiment of the present application is directed to a computer program product that includes a computer readable medium having instructions stored thereon for supporting management of network resources. The instructions, when carried out by a processor of a respective computer device, cause the processor to perform the steps of: i) enabling a user to manage a configuration of a storage area network via a guided mode in which a graphical user interface displays, to the user, a set of automatically generated operations to be performed by the user to execute a storage area network management function; ii) enabling the user to manage configuration of the storage area network via an interactive mode in which the graphical user interface enables the user free navigation amongst storage area network resources and initiation of user-generated operations on the storage area network resources to execute the storage area network management function; and iii) preserving state information of performed operations associated with the storage area network management function while the user switches between the guided mode and the interactive mode of the graphical user interface. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

The description below includes several useful techniques of at least partially guiding a user through a management process while also enabling the user to freely navigate amongst storage area network resources and initiate operations in furtherance of executing a management function to configure the storage area network. As discussed, such techniques simplify the management process so that a user (e.g., an inexperienced network administrator) is less likely to make mistakes during a configuration or reconfiguration of the storage area network.

Accordingly, techniques of the present application include methods and apparatuses facilitating management of resources. As an example, in the context of a storage area network, a resource manager (e.g., a network manager software application) generates a graphical user interface that enables a user to manage a configuration of the storage area network via a guided mode in which a graphical user interface displays, to the user, a set of automatically generated operations to be performed by the user to execute a storage area network management function.

Based on input from the user, the resource manager also generates a graphical user interface also enables the user to manage configuration of the storage area network via an interactive mode in which the graphical user interface enables the user free navigation amongst storage area network resources and initiation of user-generated operations on the storage area network resources to execute the storage area network management function. In furtherance of executing the management function, the resource manager preserves state information of performed operations associated with the storage area network management function while the user switches between the guided mode and the interactive mode of the graphical user interface. Consequently, a user can perform a portion of operations in the guided mode and a portion of operations in an interactive mode to execute a corresponding management function without losing results of operations performed in either mode.

Figure 1:
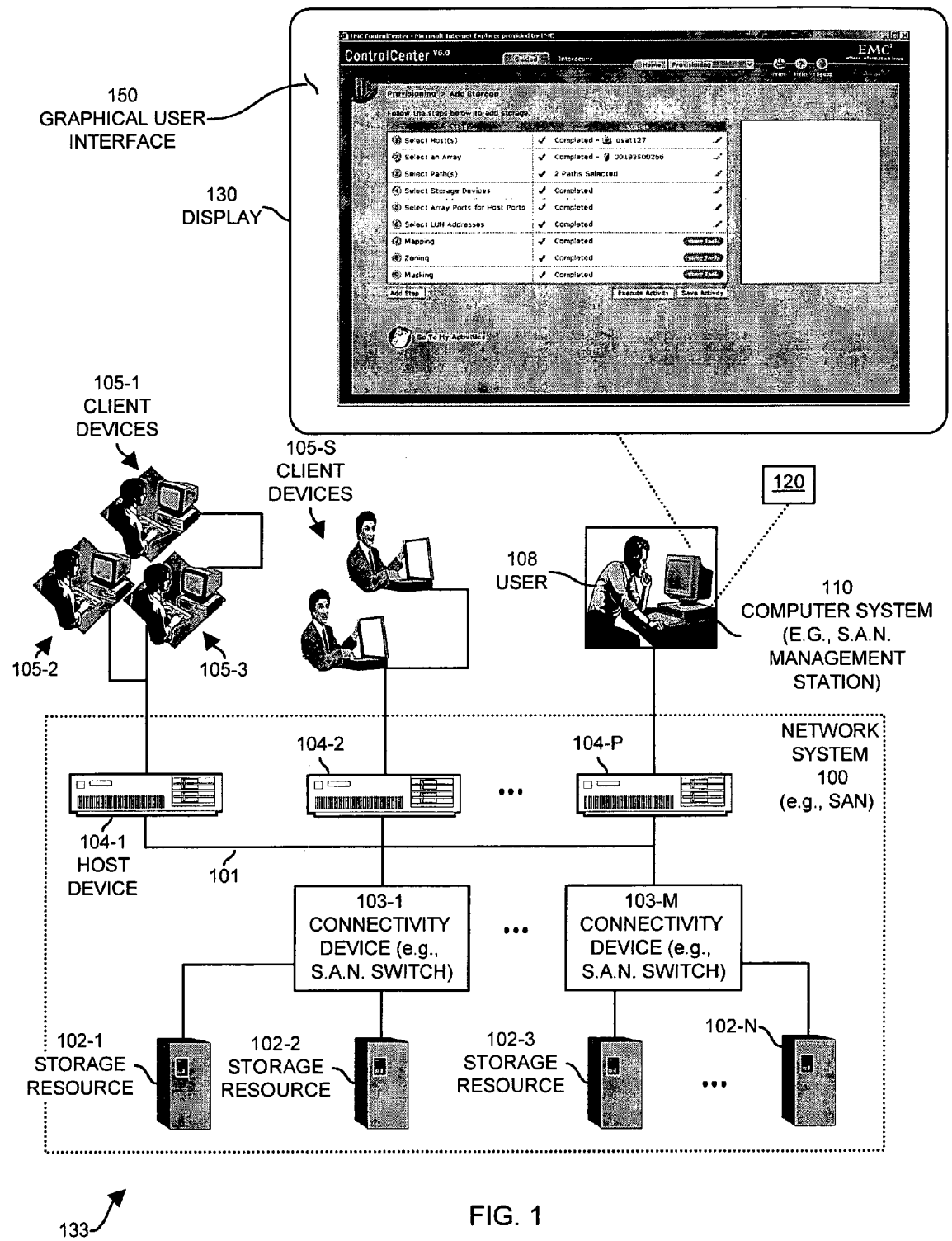
FIG. 1 is a pictorial diagram of a storage area network and corresponding management station configured to operate according to an embodiment of the present application.

FIG. 1 illustrates a storage area network environment 133 suitable for explaining an operation of example embodiments herein. As shown, network system 100 (e.g., potentially including multiple types of networks) includes a network medium 101 such as a high-speed data communications medium (e.g., Ethernet, optical network, or other type of network) that interconnects a plurality of components such as storage resources 102-1, 102-2, . . . , 102-N (collectively, storage resources 102), network switches 103-1, . . . , 103-M (collectively, network switches 103 such as SAN switches), host devices 104-1 (e.g., host servers), 104-2, . . . , 104-P (collectively, host devices 104), client devices 105-1, 105-2, . . . , 105-S (collectively, client devices 105), and computer system 110 (e.g., a storage area network management station). Computer system 110 includes resource manager 120 such as a software application that supports generation of graphical user interface 150 on display 130.

In the example shown, computer system 110 is configured as a storage area network management station operated by network manager or user 108 (e.g., a user responsible for managing resources associated with storage area network 100). Computer system 110 executes a resource manager application 120 (e.g., a software graphical user interface application more particularly shown in FIG. 2 and discussed throughout this application) that generates and displays information in accordance with embodiments explained herein.

The resource manager 120 in this example context may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a computer monitor or other visual display device) that resource manager 120 controls to display a graphical user interface 150 as explained herein. In general, user 108 provides input commands to control what information (e.g., tables, pop-up screens, etc.) is displayed on display 130. For example, a user 108 typically first makes a selection of a management function (e.g., adding storage, removing storage, replacement of a host bus adapter, adding and removing storage based on a policy, adding data access paths, managing policies, managing pools, etc.) to be applied to the storage area network environment 133. In response to the selection, computer 110 generates (e.g., a guided mode of a) graphical user interface 150 guiding the user 108 through performance of process steps to carry out the selected management function. As will be discussed further in this application, the resource manager 120 supports generation of (e.g., an interactive mode of a) graphical user interface 150 enabling the user to perform further operations to carry out the management function in different modes.

Figure 2:
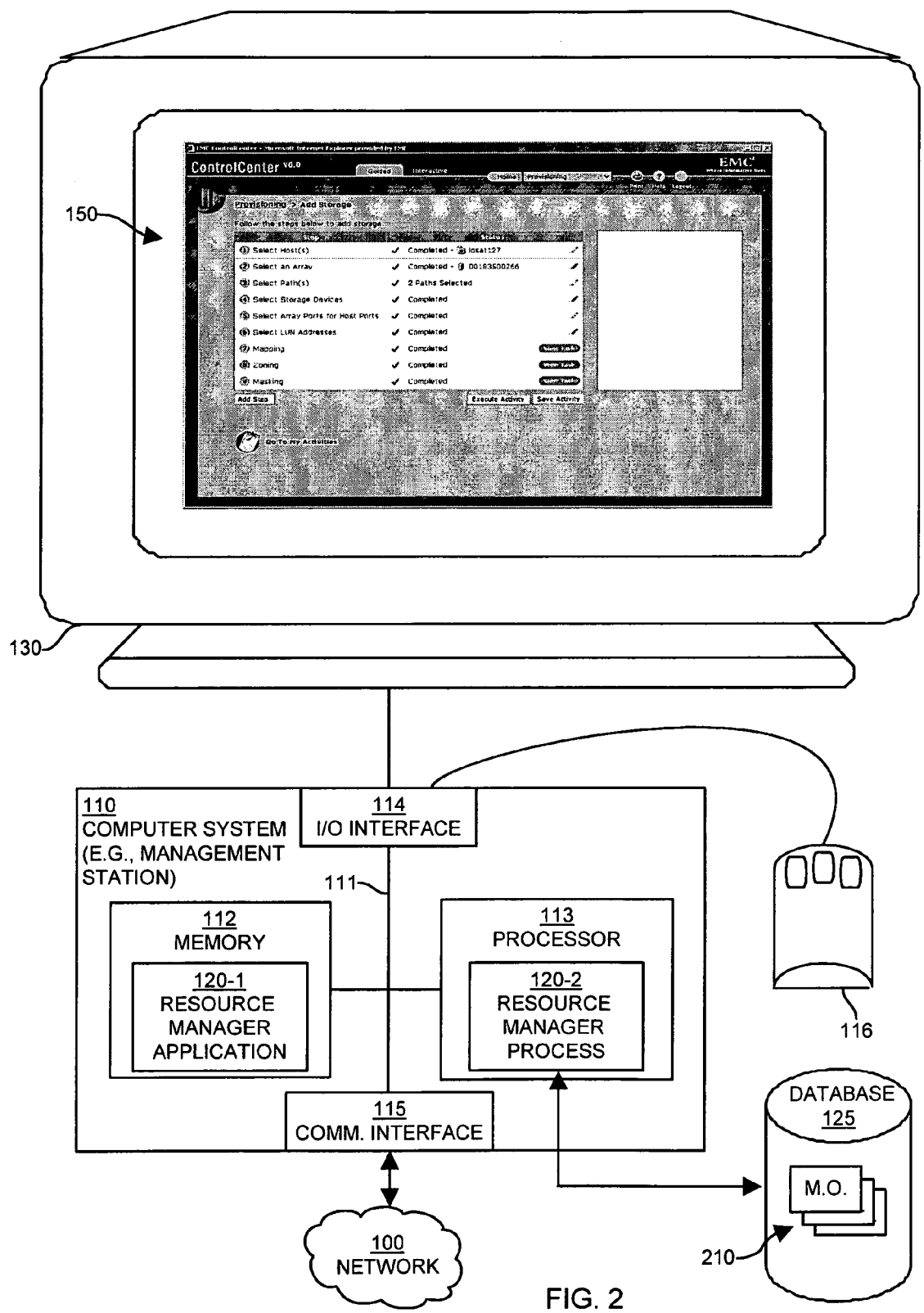
FIG. 2 is a block diagram of a sample architecture associated with the computer system management station for executing a resource manager application to generate a graphical user interface.

FIG. 2 is a block diagram illustrating an example architecture of computer system 110 (e.g., a storage area network management station). Computer system 110 may be a digital processing device such as a personal computer, workstation, portable computing device, console, laptop, network terminal or the like. As shown, computer system 110 of the present example includes an interconnect 111 that couples a memory system 112, a processor 113, an input/output interface 114, and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software resource entities associated with host devices 104, storage resources 102, etc.) in network system 100. Communications interface 115 enables computer system 110 (and corresponding user 108) to communicate with other devices (i.e., resources) associated with network 100.

As shown, memory system 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110. As discussed, one purpose of the resource manager 120 is to enable a user to perform operations associated with a management function via a guided and interactive mode of the graphical user interface 150.

It should be noted that the resource manager 120 executed in computer system 110 is represented in FIG. 2 by either one or both of the resource manager application 120-1 and/or the resource manager process 120-2. For purposes of this discussion, general reference will be made to the resource manager 120 as performing or supporting the various steps and functional operations to carry out techniques discussed herein.

It should also be noted that example configurations herein include the resource manager application 120-1 itself (i.e., the un-executed or non-performing logic instructions and/or data). The resource manager application 120-1 may be stored on a computer readable medium (such as a floppy disk), hard disk, or optical medium. The resource manager application 120-1 may also be stored in a memory system 112 such as in firmware, read only memory (ROM), or, as in this example, as executable code in, for example, Random Access Memory (RAM). In addition to these embodiments, it should also be noted that other embodiments herein include the execution of resource manager application 120-1 in processor 113 as the resource manager process 120-2. Thus, those skilled in the art will understand that the computer system 110 may include other processes and/or software and hardware components, such as an operating system that facilitates carrying out the selected management function associated with the storage area network.

To display certain information (e.g., icons representing resources in a storage area network) in graphical user interface 150, the host computer system 110 (e.g., the resource manager process 120-2) extracts information from database 125. For example, in one embodiment, the resource manager 120 receives an identity of at least one selected network management function to be executed in the storage area network environment 133. Based on process steps associated with the selected management function, the resource manager 120 extracts and displays information associated with the managed objects 210 to guide the user 108 through process steps that are performed to execute the selected management function.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software resources associated with network system 100 or storage area network environment 133 in general. More details regarding use of managed objects 210 corresponding to resources in storage area network environment 133 will be discussed in connection with FIG. 3.

Figure 3:
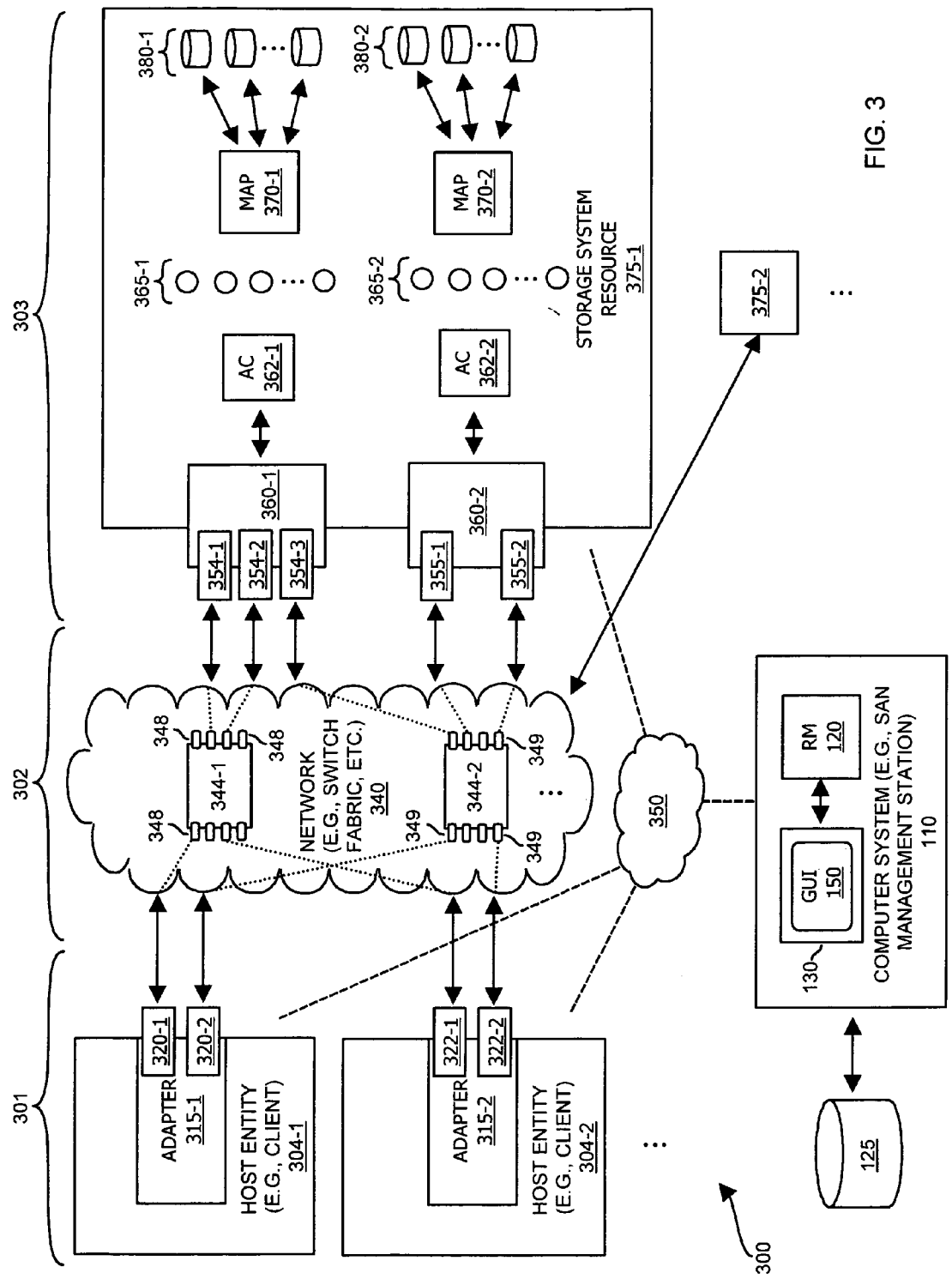
FIG. 3 is a more detailed diagram of a storage area network environment for operating a resource manager application to configure a storage area network.

FIG. 3 is a block diagram more particularly illustrating connectivity of example network resources (e.g., host resources 301, switch resources 302, and storage resources 303) in a storage area network environment 300. As shown, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 125. Network 340 includes switch device 344-1, switch device 344-2, and corresponding switch ports 348 and 349. Host entity 304-1 includes adapter 315-1. Adapter 315-1 has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

At a high level, FIG. 3 illustrates resources of a storage area network that potentially can be configured by user 108 using graphical user interface 150 generated by resource manager 120. As discussed, graphical user interface 150 facilitates configuring storage area network environment 300 based on a guided and interactive viewing modes, which will be more particularly discussed in FIGS. 4-6.

In terms of resources as shown in FIG. 3, network 340 and related resources enable host entities 304 (e.g., servers, host computers, etc.) to access data in storage system resources 375 on behalf of clients. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375.

Based on paths through these resources, host entities 304 access data from physical storage devices 380. For example, host entity 304-1 accesses data from physical storage devices 380 based on a connection path through adapter 315-1, port 320-1, switch 344-1, port 354-1, adapter 360-1 to storage system resource 375-1. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone set defines a group of resources in the network providing a logical path between a host resource and a storage array resource. As will be discussed in more detail, the resource manager 120 enables selection of a management function associated with the storage area network environment 300 and guides the user 108 through corresponding process steps to execute the selected management function and configure resources in storage area network 300. This is discussed in more detail in the following text and related figures.

FIGS. 4-7 are screenshots of different management views of graphical user interface 150 (FIG. 1) facilitating execution of a selected management function according to embodiments of the present application.

Figure 4:
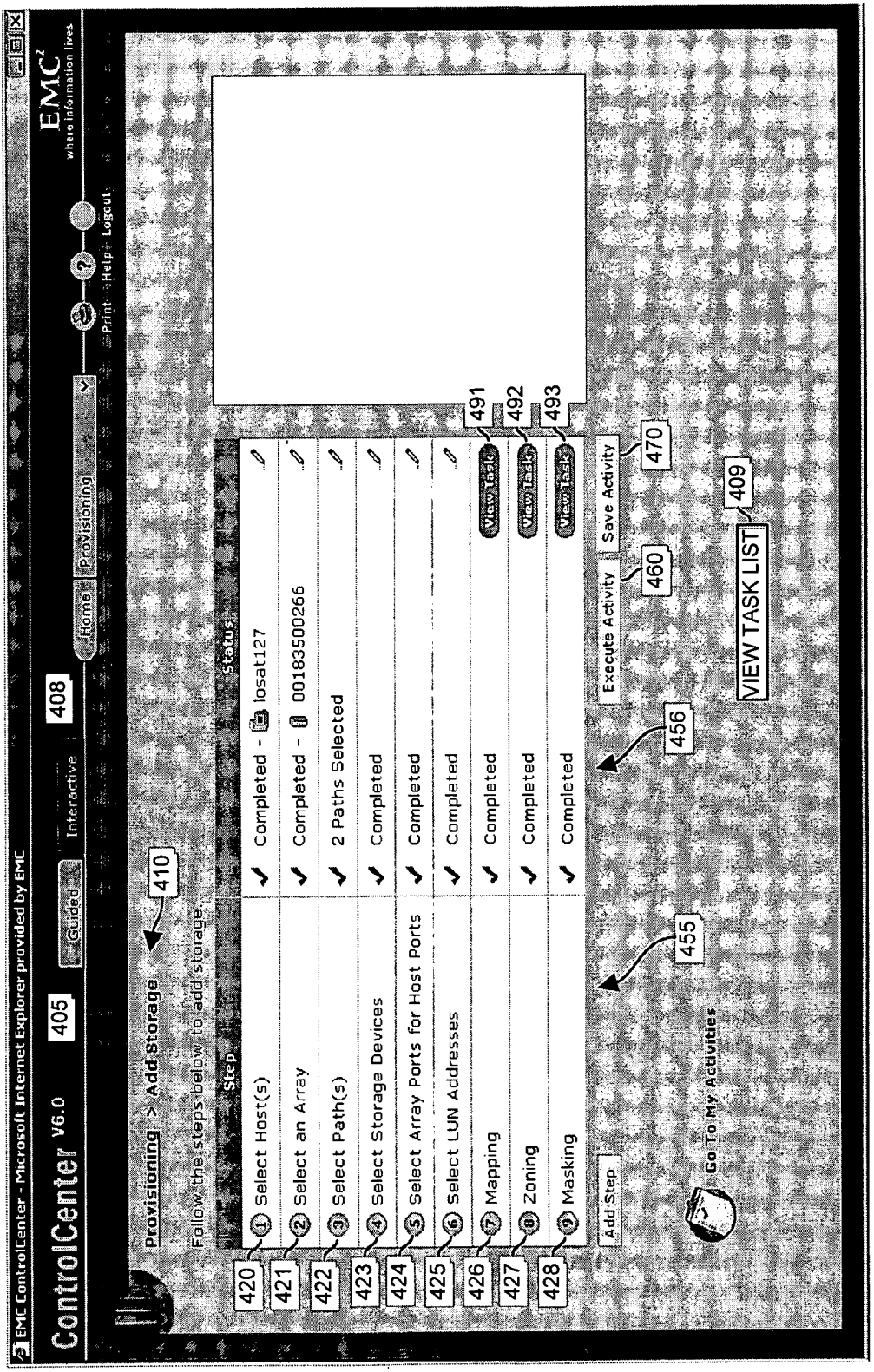
FIG. 4 is a screenshot of a graphical user interface for guiding a user through execution of a management function.

For example, FIG. 4 is a screenshot 400 of graphical user interface 150 generated as a result of user 108 initiating execution of a storage area network management function such as an ADD storage management function in which a user 108 allocates extra storage to a host entity for storing data. Other types of management functions supported by resource manager 120 include functions such as remove storage, replace host bus adapter, add storage by policy, remove storage by policy, add paths to existing storage, etc. Due to the complexity of configuring a storage area network, each of these functions typically requires that a user 108 perform multiple operations (e.g., process steps) with respect to host resources, switch resources, and storage resources to complete a respective management functions. Use of the guided mode as in screenshot 400 simplifies a process of executing a management function.

Referring now more specifically to screenshot 400 in FIG. 4, icon 405 is highlighted indicating that user 108 has at least initially selected a "guided" mode for carrying out the ADD storage management function. In general, the guided mode in screenshot 400 displays a list of operations (e.g., process steps 420-428) that have been performed (or should be performed) by the user 108 to carry out a respective management function. It is not necessary that all operations associated with the management function be complete or even be shown in the list to switch over to the interactive mode in lieu of the guided viewing and execution mode.

Header 410 identifies a path associated with producing screenshot 400. That is, header 410 indicates that user 108 initially selected a topic of "provisioning" storage and thereafter an "ADD storage" management function in a provisioning display screen to arrive at screenshot 400.

Screenshot 400 includes a column 455 (e.g., labeled as "Step" column) of process steps 420 through 428 and a column 456 (e.g., labeled as "Status" column) of corresponding status information. As their names suggest, the step column 455 includes a list of process steps (e.g., process step 420, process step 421, process step 422, . . . process step 428) associated with the selected ADD storage management function. In general, resource manager 120 fills in row entries of column 455 with process steps depending on selection of resources associated with one or more of initial process steps 420, 421, and 422. Thus, a listing of operations to be performed for a given management function changes or grows depending on selections by the user 108 for at least an initial set of operations associated with the management function.

Status column 456 provides an indication to the user 108, in this example case, that all of the process steps 420-428 have been completed. Other types of status identifiers in column 456 may indicate that a process step has not yet been performed or is still pending. For example, a process step can have an associated symbol indicating that a background task is running for a given step or may include no symbol at all indicating that the process step or steps has not yet been performed.

Note that, although all process steps in column 455 have been completed in the example shown, techniques herein also apply to cases in which only a portion of a set of process steps in screenshot 400 have been performed. That is, a user 108 may perform a portion of process steps in a guided mode of screenshot 400 and thereafter view results of a performed process step in the interactive mode even though all profess steps have not yet been completed. Consequently, a user 108 can perform a first set of operations while in the guided mode and a second set of operations in the interactive mode via graphical user interface 150. Note that in certain applications, the ordering of performing process steps does not matter. For example, the second set of operations can be performed prior to performing the first set of process steps and vice versa.

As shown, process step 420 identifies that the first step associated with the add storage management function is to select a host. Note that certain process steps in column 455 may need to be performed before performing other process steps. For example, the resource manager 120 may restrict a user 108 to select a host in process step 420 before performing a mapping operation in process step 426.

Process step 421 identifies that the second step associated with the add storage management function involves an operation of selecting a storage array.

Process step 422 identifies that the third step associated with the add storage management function involves an operation of selecting a path between the previously selected host and storage array.

Process step 423 identifies that the fourth step associated with the add storage management function involves an operation of selecting storage devices in storage area network.

Process step 424 identifies that the fifth step associated with the add storage management function involves an operation of selecting array ports for respective host ports.

Process step 425 identifies that the sixth step associated with the add storage management function involves an operation of selecting LUN addresses for the devices.

Process step 426 identifies that the seventh step associated with the add storage management function involves a mapping operation.

Process step 427 identifies that the eighth step associated with the add storage management function typically involves a zoning operation.

Process step 428 identifies that the ninth step associated with the add storage management function involves a masking operation. A discussion of carrying out process steps 420-428 can be found in related application entitled "METHODS AND APPARATUS FOR GUIDING A USER THROUGH A SAN MANAGEMENT PROCESS," by Hanna Yehuda and Morrie Gasser, Ser. No. 11/021,107, filed on a same date as the present application, the entire teachings of which are incorporated herein by this reference.

As discussed, the resource manager 120 enables a user 108 to manage a configuration of the storage area network 300 via a guided mode in which a graphical user interface 150 displays, to the user 108, a set of automatically generated operations (e.g., a predefined set of operations) to be performed by the user 108 to execute a storage area network management function. While in the "guided" mode, as indicated by guided mode icon 405, a user 108 can activate a switchover to an interactive mode of graphical user interface 150. This can be achieved in a number of ways.

For example, the user 108 can click on icon 408 (e.g., "interactive" icon), view task icon 491, view task icon 492, view task icon 493, view task list icon 408 to switch over to the interactive mode. In general, the interactive mode of graphical user interface 150 enables the user free navigation amongst storage area network resources and initiation of user-generated operations on the storage area network resources to execute the storage area network management function and configure the storage area network 300. That is, while in the interactive mode, the user 108 can use conventional management software to select and display resources associated with the storage area network and apply configuration tools to configure the storage area network. In contrast, the guided mode provides more structure to execute a management function and is therefore simpler for inexperienced users to configure storage area network 300.

According to one application, when switching from one mode to another (e.g., from the guided mode to the interactive mode or vice versa), the resource manager 120 preserves state information associated with the operations (e.g., process steps) for executing a respective management function. For example, resource manager 120 receives input (e.g., state information) from user 108 to complete process steps in screenshot 400. Based on the input, the resource manager 120 performs background software processes for certain process steps such as mapping, zoning, and masking process steps 426, 427, and 428. These background software processes also produce state information that is preserved by resource manager 120 while switching between modes. For example, a software process associated with mapping process step 426 can produce mapping information identifying a mapping between the selected host entities (e.g., process step 420) and storage devices (e.g., process step 423). After switching to the interactive mode, the user 108 can view and potentially perform additional operations on this state information.

Assuming that a given operation such as a mapping process step has been completed, the user 108 can click on an associated view task icon 491 (as well as one of view task icon 492, view task icon 493, view task list 408, and interactive icon 408) to switch to viewing in the interactive mode. For example, in response to clicking on view task icon 491, resource manager 120 switches graphical user interface 150 to an interactive viewing mode as shown in FIG. 5.

Figure 5:
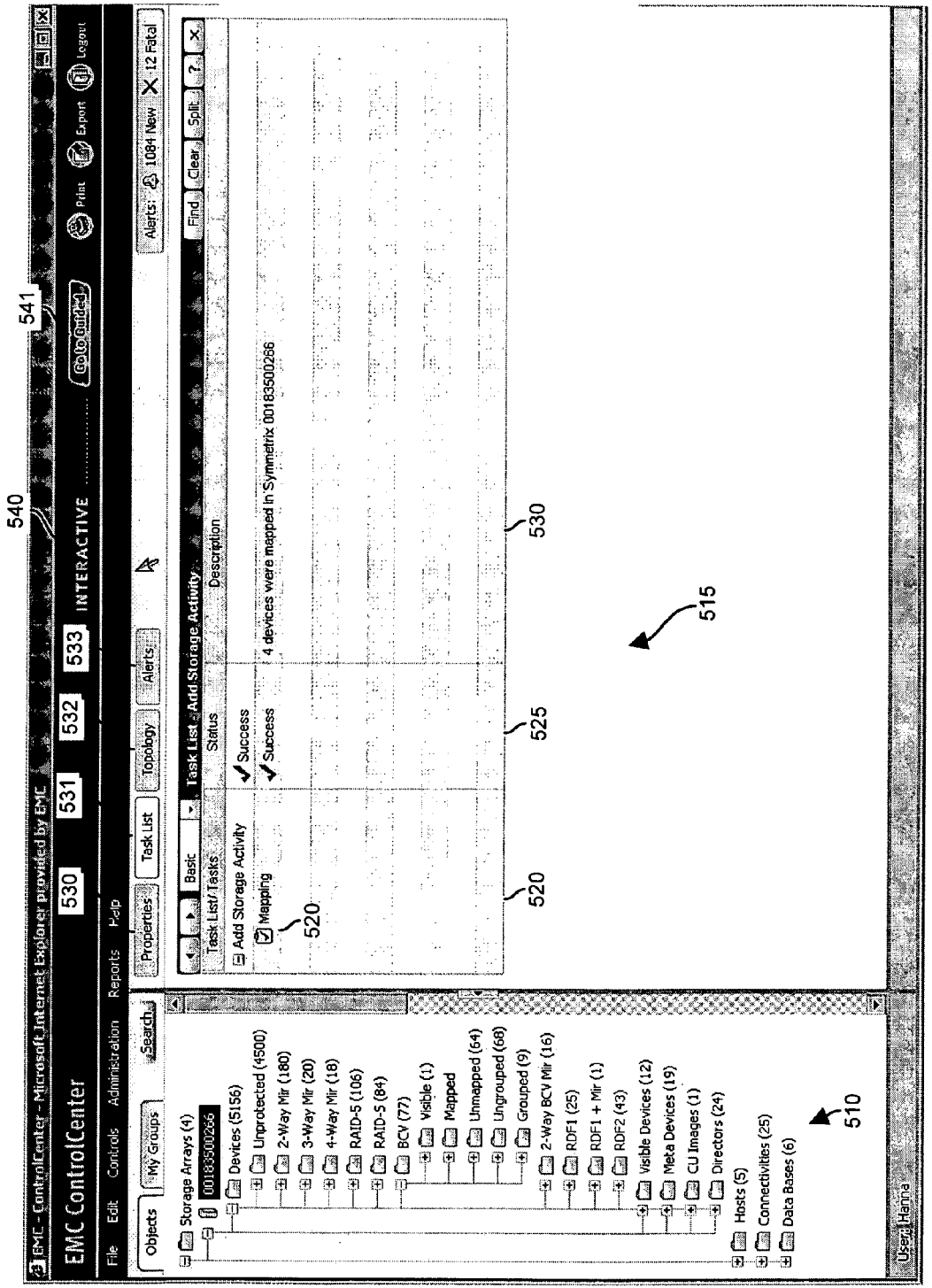
FIG. 5 is a screenshot of a graphical user interface illustrating an interactive mode enabling a user to further execute a management function.

FIG. 5 is a screenshot 500 of a graphical user interface 150 illustrating an interactive mode of resource manager 120. As shown, interactive icon 540 indicates that a user viewing screenshot 500 presently is viewing resources in the interactive mode. To switch back to the guided mode, user 108 can select "go to guided" icon 541.

The interactive viewing mode (e.g., as shown screenshot 500) supported by resource manager 120 enables a user 108 to further execute operations or view specific information (e.g., preserved state information) associated with a management function at least partially executed in the guided mode. For example, a user 108 can click on mapping icon 522 in column 520 to view further details associated with the mapping process step as shown in the entry of task list table 515. Selectable display regions (e.g., properties icon 530, task list icon 531, topology icon 532, and alerts icon 533) above the task list table 515 enable the user 108 to view information (e.g., state information such as mapping information) in different respective view modes such as a properties view mode, task list view mode, topology view mode, and alerts view mode.

Task list table 515 of screenshot 500 includes a column 520 of tasks such as mapping as shown. Note that if user 108 selected view task list icon 409 in FIG. 4 (instead of view task icon 491), then the task list table 515 in FIG. 5 would include entries for zoning and masking as well as mapping as already shown. When multiple entries appear, a user 108 can further click one or more of entries (e.g., mapping, masking, and/or zoning) in the task list table 515 to view further state information associated with an entry in the different view modes. User 108 can also select resources in hierarchy of icons 510 and view these resources in different view modes Column 520 of task list table 515 indicates a status of entries in the task list table 515 while column 530 provides a description of the corresponding entries. In this example, column 530 includes an entry indicating that the mapping entry in the task list involves a mapping of 4 devices in Symmetrix™ 00183500266 storage resource.

When in the interactive mode, resource manager 120 displays (at left in screenshot 500) hierarchy of icons 510 including a hierarchy of resources associated with a respective management task. For example, as shown, resource manager 120 highlights resource "00183500266" to indicate a respective resource pertaining to the task list table 515 displayed in the right hand portion of screenshot 500. This enables user 108 to immediately identify a relevant resource in the hierarchy of icons 510 that corresponds with the contents of task list table 515. In this case, highlighting in hierarchy of icons 510 indicates that table 515 includes information associated with configuration of storage array 00183500266.

In general, as mentioned, the interactive mode illustrated in screenshot 500 supports free navigation and configuration of storage area network. However, unlike conventional methods, screenshot 500 includes task list table 515 of tasks performed while in the interactive mode, but results of which are viewable in the interactive mode. As discussed, a user 108 can view results of a mapping function at least partially performed in the guided mode and thereafter modify or tweak (e.g., perform another operation on) results of the mapping operation associated with the ADD storage management function. For example, user 108 can display and modify mapping information in the interactive mode. As mentioned, selectable display regions (e.g., properties icon 530, task list icon 531, topology icon 532, and alerts icon 533) above the task list table 515 enable the user 108 to view information in different respective view modes such as a properties view mode, task list view mode, topology view mode, and alerts view mode.

More advanced configurations of resource manager 120 enable a user 108 to perform a management function based operations performed in both the guided mode and the interactive mode. For example, resource manager 120 can be configured to enable a user 108 to perform a portion of operations associated with a respective management function while in the guided mode and thereafter perform certain operations to execute the management function based on the user initiating further operations (e.g., mapping, zoning, masking, selection of resources, etc.) in the interactive mode. In such an application, resource manager 120 enables a user 108 to perform one or more operation while in the interactive mode without being prompted by user 108 to execute the operations. Thus, user 108 can perform operations associated with a management function without being prompted by a respective process step in the guided mode. A table of process steps in the guided mode, however, can be updated to include any operations performed in the interactive mode so that the user does not duplicate his actions after switching to the guided mode.

As previously mentioned, management of a storage area network may be a complex task even for experienced users. Accordingly, yet other configurations of resource manager 120 enable a user 108 to complete or partially complete a listing of process steps while in the guided mode and thereafter prompt resource manager 120 to display a corresponding action or set of actions that an experienced user would initiate in the interactive viewing mode to execute the given operation. Accordingly, resource manager 120 can guide a user 108 through a management function and thereafter teach the user 108 how operations associated with the management function can be achieved using the interactive viewing mode and the software tools that the interactive mode supports.

Figure 6:
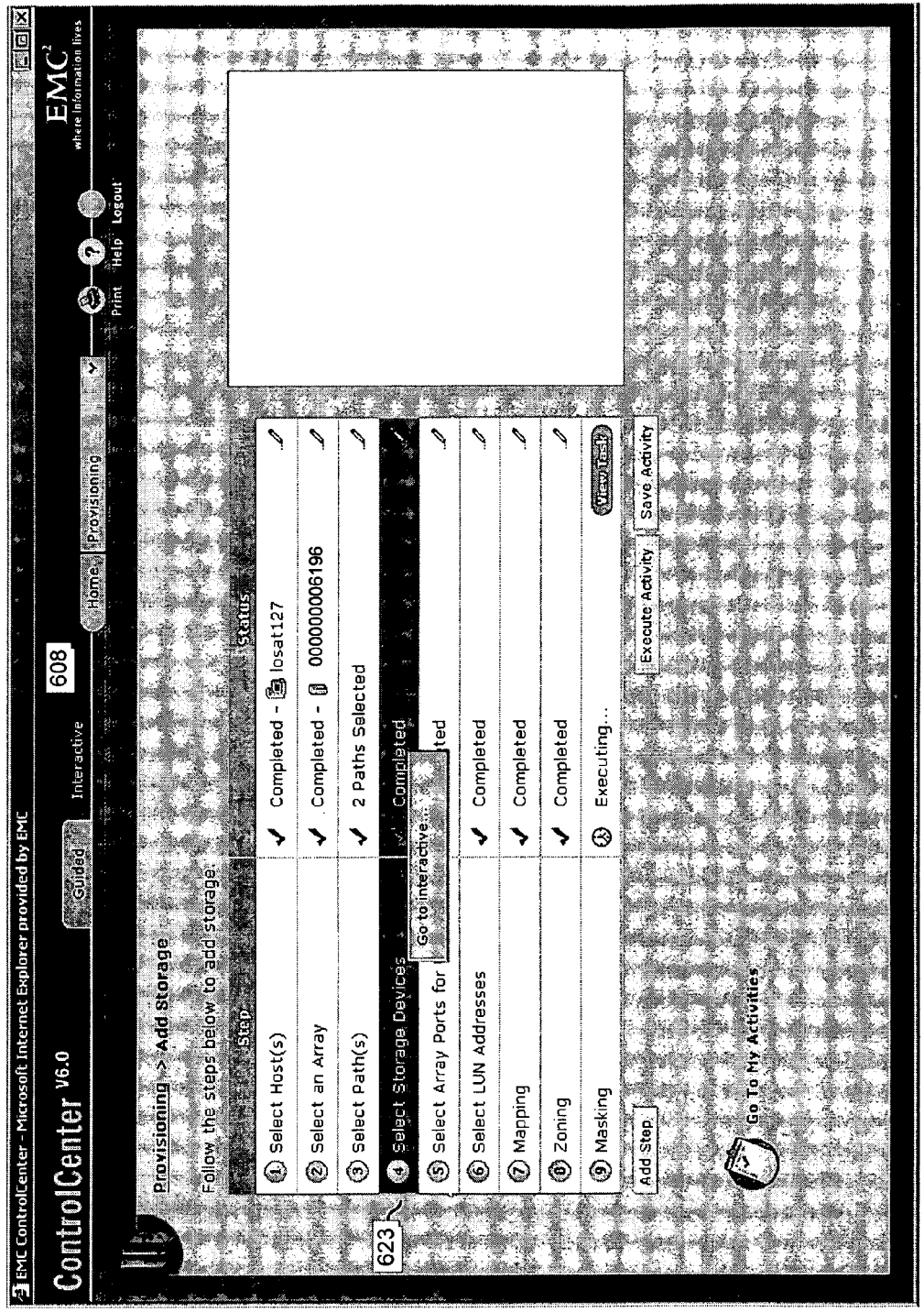
FIG. 6 is a screenshot of a graphical user interface for at least partially guiding a user through execution of a management function and enabling switchover to an interactive viewing mode.

FIG. 6 is a screenshot 600 of graphical user interface 150 generated as a result of user 108 initiating execution of a management function such as an ADD storage management function in which a user 108 allocates extra storage to a host entity for storing data in storage array 0000000006196. In a similar manner as previously discussed, user 108 can execute this management function by performing at least some operations in the guided mode. In the example case shown in screenshot 600, the user 108 can switch to the interactive mode and view corresponding state information associated with operations (e.g., process steps) in screenshot 600. For example, as shown, user selects and highlights process step 623. Thereafter, user 108 clicks on interactive mode icon 608 to switch over to the interactive mode as shown in FIG. 7.

Figure 7:
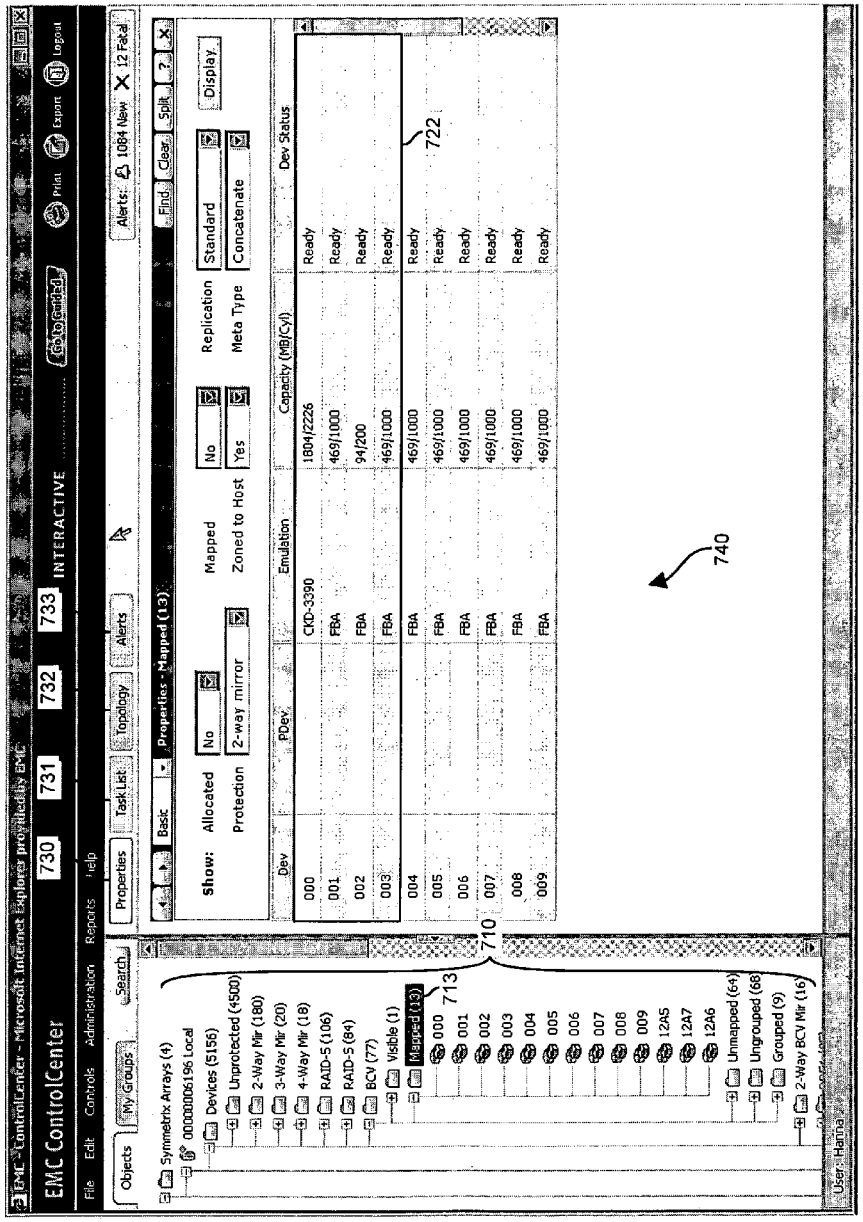
FIG. 7 is a screenshot of a graphical user interface illustrating an example of mapping properties associated with an ADD storage management function executed by a user configuring a storage area network.

FIG. 7 is a screenshot 732 of a graphical user interface illustrating an example of mapped devices associated with an ADD storage management function executed by a user configuring a storage area network. In the previous figure (e.g., FIG. 6), the user 108 performed a function of adding storage to host entity losat 127 (see process step 621). As shown in screenshot 732 of FIG. 7, resource manager 120 displays table 740 including a properties view of mapped devices associated with storage array 000000006196. Screenshot 700 illustrates another example of a user 108 being able to view and manage resources in an interactive mode.

Resource manager 120 supports different viewing modes based on selection of properties icon 630, task list icon 631, topology icon 632, and alerts icon in a similar way as discussed for view mode icons in FIG. 4. Hierarchy of icons 710 illustrates resources associated with the ADD storage management function as shown in FIG. 6. In this case, assume that losat 127 was previously mapped to devices 004, 005, 006, 007, 008, 009, 12A5, 12A6, and 12A7. Via the guided view mode in FIG. 6, assume that the user 108 added devices 000, 001, 002, 003 as shown in hierarchy of icons 710 to losat 127. In this case, resource manager 120 highlights regions 722 in table 740 to identify newly added (as well as previously existing) storage devices accessible to host losat 127 as a result of executing the operations in FIG. 6. Thus, a user 108 can view results of configuring the storage area network in an interactive viewing mode based on operations performed in the guided mode.

Figure 8:
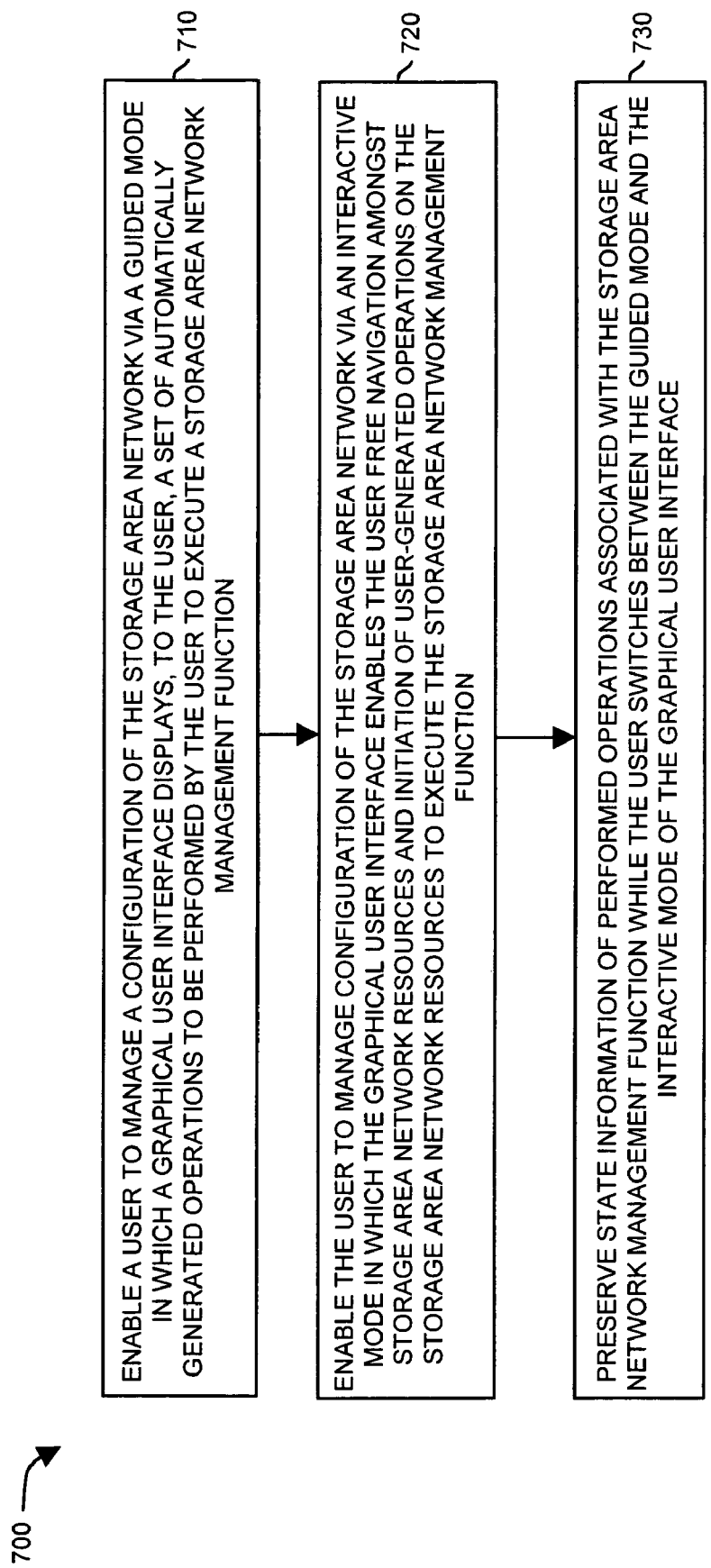
FIG. 8-11 are flowcharts illustrating various techniques of facilitating execution of a management function to configure a storage area network.

FIGS. 8-11 are flowcharts illustrating various techniques of enabling a user to execute a management function associated with a storage area network according to embodiments of the present application. For example, FIG. 8 is a flowchart 700 illustrating a technique of configuring storage area network environment 300 based on use of a graphical user interface 150 supporting both a guided mode and an interactive mode for receiving data input from a user 108 and displaying, among other things, configuration information. Note that the following discussion may include concepts and techniques that overlap with the concepts discussed above.

In step 710 of FIG. 8, the resource manager 120 enables a user 108 to manage a configuration of the storage area network 300 via a guided mode in which a graphical user interface 150 displays, to the user 108, a set of automatically generated operations to be performed by the user 108 to execute a storage area network management function.

In step 720, the resource manager 120 enables the user 108 to manage configuration of the storage area network 300 via an interactive mode in which the graphical user interface enables the user free navigation amongst storage area network resources and initiation of user-generated operations on the storage area network resources to execute the storage area network management function.

In step 730, the resource manager 120 preserves state information of performed operations associated with the storage area network management function while the user 108 switches between the guided mode and the interactive mode of the graphical user interface 150. Consequently, a user 108 can perform a portion of operations in the guided mode and a portion of operations in an interactive mode to execute a corresponding management function without losing results of operations performed in either mode.

Figure 9:
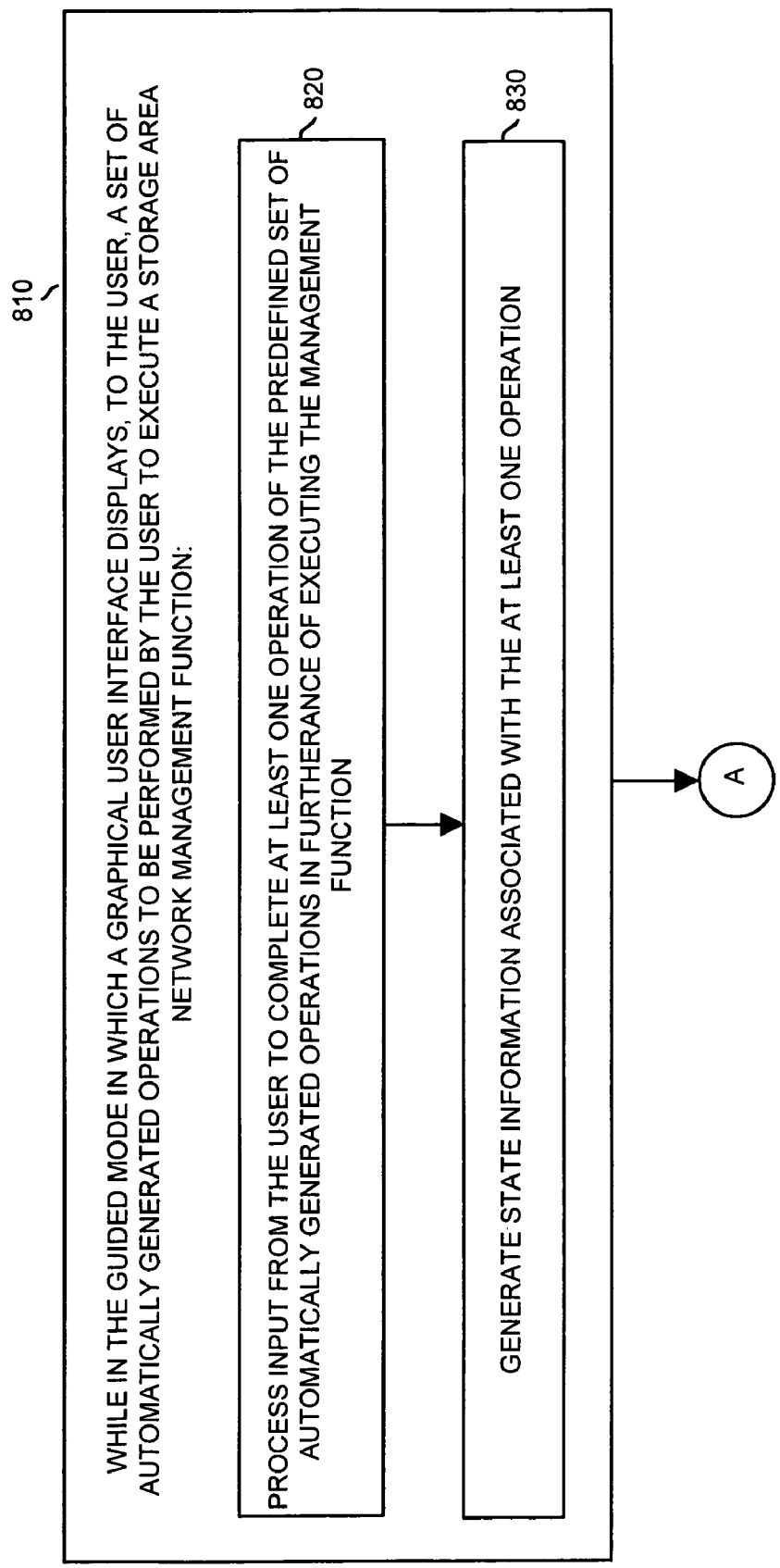
Figure 10:
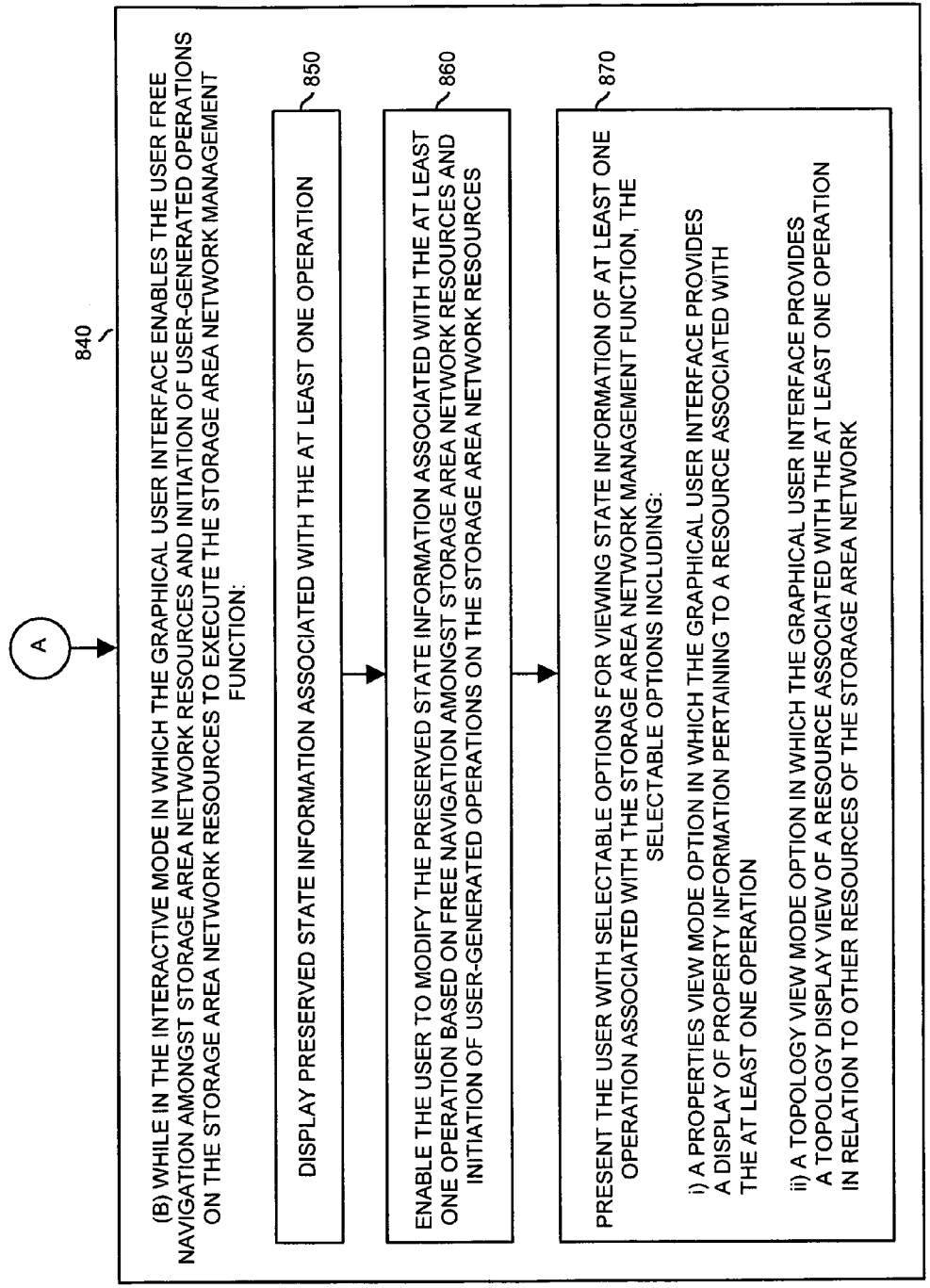

FIGS. 9 and 10 combine to form flowchart 800 illustrating processing steps performed by resource manager 120. As discussed, resource manager 120 enables user 108 of the management station computer system 110 to at least be partially guided through execution of a management function such as adding storage, removing storage, etc. Resulting data information generated based on operations associated with the management function can be reviewed or additional operations associated with the management function can be further performed in the interactive mode of graphical user interface 150.

In step 810 of FIG. 9, resource manager 120 supports a guided mode in which a graphical user interface 150 displays, to the user 108, a set of automatically generated operations to be performed by the user to execute a storage area network management function.

In step 820, while in the guided mode, resource manager 120 processes input from the user 108 to complete one or more operations of a predefined set of automatically generated operations in furtherance of executing a management function.

In step 830, while also in the guided mode, the resource manager 120 generates state information associated with the one or more operations.

In step 840 of FIG. 10, resource manager 120 switches to an interactive mode in which the graphical user interface 150 enables the user 108 free navigation amongst storage area network resources and initiation of user-generated operations on the storage area network resources to execute the storage area network management function. In one application, resource manager 120 switches over to the interactive mode based on a user selecting a selectable region in the graphical user interface 150.

In step 850, while in the interactive mode, resource manager 120 displays preserved state information associated with one or more operations previously performed in the guided mode.

In step 860, the resource manager 120 enables the user 108 to modify the preserved state information associated with the one or more operations based on free navigation amongst storage area network resources and initiation of user-generated operations on the storage area network resources.

In step 870, the resource manager 120 presents the user 108 with selectable options for viewing state information of one or more operation associated with the storage area network management function, the selectable options including: a) a properties view mode option in which the graphical user interface 150 provides a display of property information pertaining to a resource associated with the one or more operation, and b) a topology view mode option in which the graphical user interface 150 provides a topology display view of a resource associated with the one or more operation in relation to other resources of the storage area network 300.

Figure 11:
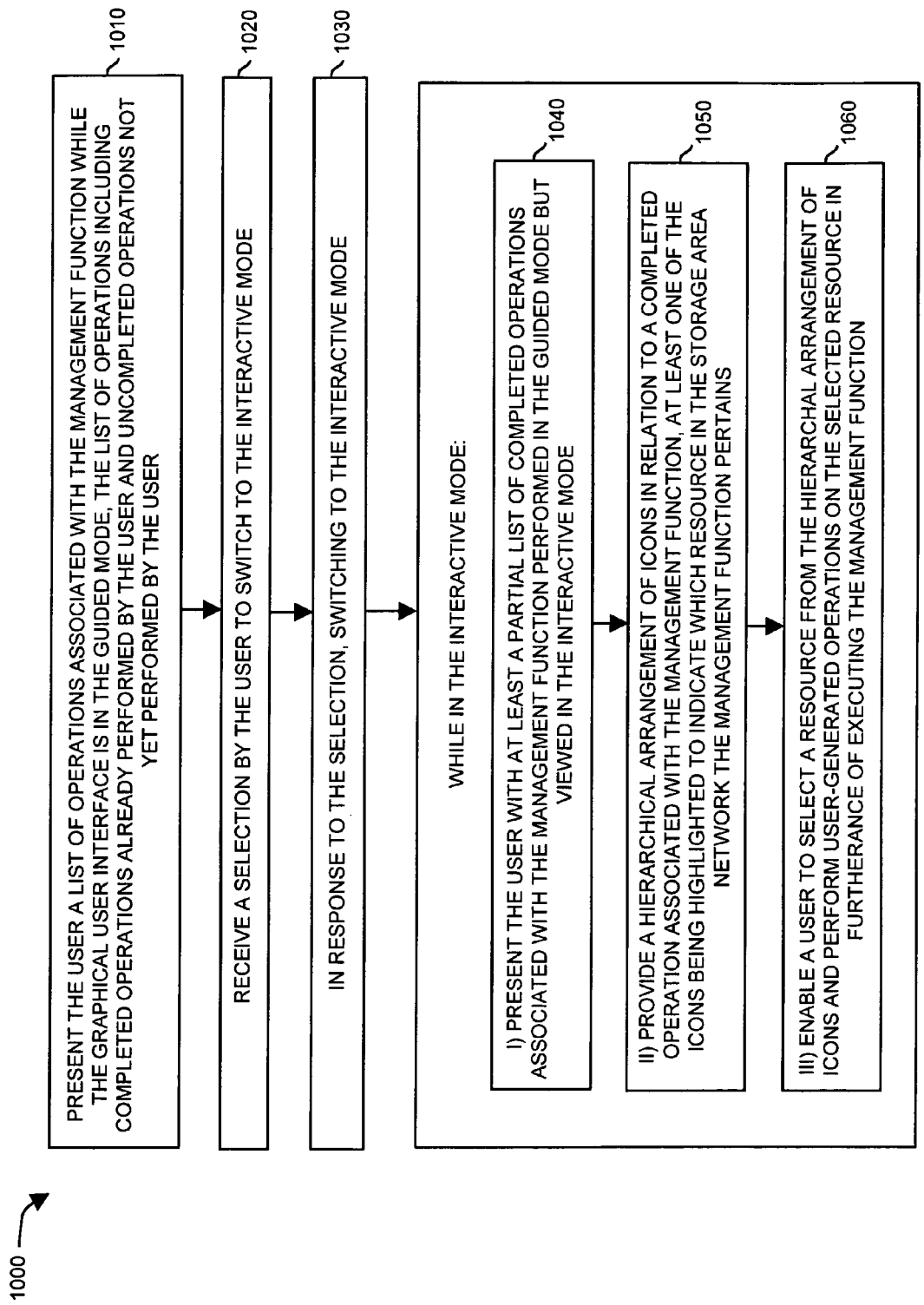

FIG. 11 is a flowchart 1000 illustrating processing steps performed by resource manager 120. As discussed, resource manager 120 enables the user 108 of the management station computer system 110 to be at least partially guided through execution of a management function such as adding storage, removing storage, etc.

In step 1010, resource manager 120 presents the user 108 a list of operations associated with the management function while the graphical user interface 150 is in the guided mode. The list of operations includes completed operations already performed by the user 108 and uncompleted operations not yet performed by the user 108.

In step 1020, resource manager 120 receives a selection by the user to switch to the interactive mode. For example, In step 1030, resource manager 120 switches to the interactive mode in response to the selection.

In step 1040, now in the interactive mode, resource manager 120 presents the user 108 with at least a partial list of completed operations associated with the management function performed in the guided mode but viewed in the interactive mode.

In step 1050, resource manager 120 provides a hierarchical arrangement of icons in relation to a completed operation associated with the management function. Resource manager 120, via graphical user interface 150, highlights one or more of the icons to indicate which resource or resources in the storage area network the management function pertains.

In step 1060, resource manager 120 enables a user 108 to select a resource from the hierarchal arrangement of icons and perform user-generated operations on the selected resources in furtherance of executing the management function.

As discussed, techniques herein are well suited for use in applications such as management of storage area networks. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method facilitating management of a storage area network, the method comprising:
    enabling a user to manage a configuration of the storage area network via a guided mode in which a graphical user interface displays, to the user, a set of automatically generated operations to be performed by the user to execute a storage area network management function;

enabling the user to manage configuration of the storage area network via an interactive mode in which the graphical user interface enables the user free navigation amongst storage area network resources and initiation of user-generated operations on the storage area network resources to execute the storage area network management function;

preserving state information of performed operations associated with the storage area network management function while the user switches between the guided mode and the interactive mode of the graphical user interface; and (a) while in the guided mode:

processing input from the user to complete at least one operation of the predefined set of automatically generated operations in furtherance of executing the management function; and generating state information associated with the at least one operation; and (b) while in the interactive mode:

displaying preserved state information associated with the at least one operation; and enabling the user to modify the preserved state information associated with the at least one operation based on free navigation amongst storage area network resources and initiation of user-generated operations on the storage area network resources.

2. A method as in claim 1 further comprising:

displaying selectable regions in the graphical user interface to enable the user to select between the guided mode and the interactive mode.

3. A method as in claim 1 further comprising:

while in the interactive mode, presenting the user with selectable options for viewing state information of at least one operation associated with the storage area network management function, the selectable options including:

i) a properties view mode option in which the graphical user interface provides a display of property information pertaining to a resource associated with the at least one operation; and ii) a topology view mode option in which the graphical user interface provides a topology display view of a resource associated with the at least one operation in relation to other resources of the storage area network.

4. A method as in claim 1 further comprising:

presenting the user a list of operations associated with the management function while the graphical user interface is in the guided mode, the list of operations including completed operations already performed by the user and uncompleted operations not yet performed by the user;

receiving a selection by the user to switch to the interactive mode;

in response to the selection, presenting the user with at least a partial list of completed operations associated with the management function performed in the guided mode but viewed in the interactive mode.

5. A method as in claim 4 further comprising:

while in the interactive mode, providing a hierarchical arrangement of icons in relation to a completed operation associated with the management function, at least one of the icons being highlighted to indicate which resource in the storage area network the management function pertains.

6. A method as in claim 5 further comprising:

while in the interactive mode, enabling a user to select a resource from the hierarchal arrangement of icons and perform user-generated operations on the selected resource in furtherance of executing the management function.

7. A method as in claim 1 further comprising:

while in the guided mode, displaying a sequential list of operations associated with the management function; and providing a selectable region in relation to a given operation in the sequential list, the selectable display region enabling the user to switch to the interactive mode and view a task list associated with the given operation, the task list including a task identifier associated with the given operation.

8. A method as in claim 7 further comprising:

in response to the user activating the selectable region, switching to the interactive mode and displaying the task list as well as a status indicator in the task list to identify a corresponding status associated with the given operation, the given operation being based on one of the following: mapping, zoning, and masking associated with a storage resource in the storage area network.

9. A method as in claim 1 further comprising:

configuring the storage area network via execution of the management function, the execution of the management function including:

i) performing a first set of operations associated with the management function while in the guided mode; and ii) performing a second set of operations associated with the management function while in the interactive mode; and wherein preserving the state information includes preserving first state information associated with execution of the first set of operations and second state information associated with execution of the second set of operations.

10. A method as in claim 1, wherein preserving the state information includes preserving state information associated with a first operation executed while in the guided mode; and wherein enabling the user to manage the configuration of the storage area network via the interactive mode includes enabling the user to modify the state information associated with the first operation via execution of a second operation while in the interactive mode.

11. A method as in claim 1, wherein preserving the state information of operations enables the user to i) perform a given operation in the guided mode, ii) switch to the interactive mode, and iii) view corresponding process steps in the interactive mode required to carry out the given operation performed in the guided mode.

12. A computer system supporting guiding a user through a management process associated with a storage area network, the computer system comprising:

a processor;

a memory unit that stores instructions associated with an application executed by the processor; and an interconnect coupling the processor and the memory unit, enabling the computer system to execute the application and perform operations of:

enabling a user to manage a configuration of the storage area network via a guided mode in which a graphical user interface displays, to the user, a set of automatically generated operations to be performed by the user to execute a storage area network management function;

enabling the user to manage configuration of the storage area network via an interactive mode in which the graphical user interface enables the user free navigation amongst storage area network resources and initiation of user-generated operations on the storage area network resources to execute the storage area network function;

preserving state information of performed operations associated with the storage area network management function while the user switches between the guided mode and the interactive mode of the graphical user interface;

while in the guided mode, displaying a sequential list of operations associated with the management function; and providing a selectable region in relation to a given operation in the sequential list, the selectable display region enabling the user to switch to the interactive mode and view a task list associated with the given operation, the task list including a task identifier associated with the given operation.

13. A computer system as in claim 12 that additionally performs operations of:
(a) while in the guided mode:
processing input from the user to complete at least one operation of the predefined set of automatically generated operations in furtherance of executing the management function; and
generating state information associated with the at least one operation; and
(b) while in the interactive mode:
displaying preserved state information associated with the at least one operation; and
enabling the user to modify the preserved state information associated with the at least one operation based on free navigation amongst storage area network resources and initiation of user-generated operations on the storage area network resources.

14. A computer system as in claim 12 that additionally performs operations of:
displaying selectable regions in the graphical user interface to enable the user to select between the guided mode and the interactive mode.

15. A computer system as in claim 12 that additionally performs operations of:
while in the interactive mode, presenting the user with selectable options for viewing state information of at least one operation associated with the storage area network management function, the selectable options including:
i) a properties view mode option in which the graphical user interface provides a display of property information pertaining to a resource associated with the at least one operation; and
ii) a topology view mode option in which the graphical user interface provides a topology display view of a resource associated with the at least one operation in relation to other resources of the storage area network.

16. A computer system as in claim 12 that additionally performs operations of:
presenting the user a list of operations associated with the management function while the graphical user interface is in the guided mode, the list of operations including completed operations already performed by the user and uncompleted operations not yet performed by the user;
receiving a selection by the user to switch to the interactive mode;
in response to the selection, presenting the user with at least a partial list of completed operations associated with the management function performed in the guided mode but viewed in the interactive mode.

17. A computer system as in claim 16 that additionally performs operations of:
while in the interactive mode, providing a hierarchical arrangement of icons in relation to a completed operation associated with the management function, at least one of the icons being highlighted to indicate which resource in the storage area network the management function pertains.

18. A computer system as in claim 17 that additionally performs operations of:
while in the interactive mode, enabling a user to select a resource from the hierarchal arrangement of icons and perform user-generated operations on the selected resource in furtherance of executing the management function.

19. A computer system as in claim 12 that additionally performs operations of:
in response to the user activating the selectable region, switching to the interactive mode and displaying the task list as well as a status indicator in the task list to identify a corresponding status associated with the given operation, the given operation being based on one of the following: mapping, zoning, and masking associated with a storage resource in the storage area network.

20. A computer system as in claim 12 that additionally performs operations of:
configuring the storage area network via execution of the management function, the execution of the management function including:
i) performing a first set of operations associated with the management function while in the guided mode; and
ii) performing a second set of operations associated with the management function while in the interactive mode.

21. A computer system as in claim 20, wherein execution of the management function results in configuring resources in the storage area network to support a logical path between a host entity and a storage resource entity through a switch fabric of the storage area network.

22. A computer system as in claim 12, wherein the preserved state information includes first state information and second state information, the first state information generated based on execution of at least one operation performed by the user while in the guided mode, the second state information generated based on execution of at least one operation performed by the user while in the interactive mode.

23. A tangible computer-readable storage medium having instructions stored thereon for processing data information, such that the instructions, when carried out by a processing device, enable the processing device to perform operations of:
enabling a user to manage a configuration of a storage area network via a guided mode in which a graphical user interface displays, to the user, a set of automatically generated operations to be performed by the user to execute a storage area network management function;
enabling the user to manage configuration of the storage area network via an interactive mode in which the graphical user interface enables the user free navigation amongst storage area network resources and initiation of user-generated operations on the storage area network resources to execute the storage area network management function; and
preserving state information of performed operations associated with the storage area network management function while the user switches between the guided mode and the interactive mode of the graphical user interface;

(a) while in the guided mode:
processing input from the user to complete at least one operation of the predefined set of automatically generated operations in furtherance of executing the management function; and
generating state information associated with the at least one operation; and
(b) while in the interactive mode:
displaying preserved state information associated with the at least one operation; and
enabling the user to modify the preserved state information associated with the at least one operation based on free navigation amongst storage area network resources and initiation of user-generated operations on the storage area network resources.

24. A method facilitating management of a storage area network, the method comprising:
enabling a user to manage a configuration of the storage area network via a guided mode in which a graphical user interface displays, to the user, a set of automatically generated operations to be performed by the user to execute a storage area network management function;
enabling the user to manage configuration of the storage area network via an interactive mode in which the graphical user interface enables the user free navigation amongst storage area network resources and initiation of user-generated operations on the storage area network resources to execute the storage area network management function; and
preserving state information of performed operations associated with the storage area network management function while the user switches between the guided mode and the interactive mode of the graphical user interface;
wherein enabling the user to manage the configuration of the storage area network includes:
initiating display of the graphical user interface in the guided mode, display of the guided mode including a list of sequential operations to be performed by the user to execute the storage area network management function, the method further comprising:
after the user has executed a given operation in the list via use of the guided mode, receiving selection of the given operation in the list; and
in response to receiving input from the user requesting to view state information associated with the given operation based on selection of a display region enabling a switchover to the interactive mode, initiating display of the state information while in the interactive mode of the graphical user interface.

25. A method as in claim 24, wherein initiating display of the state information in the interactive mode comprises:
while in the interactive mode, providing an indication of changes applied to storage area network configuration data associated with the storage area network as a result of executing the given operation in the guided mode.

26. A method as in claim 25 further comprising:
while in the guided mode, initiating display of status information associated with operations in the listing to notify the user which operations in the list have been performed.

27. A method as in claim 26, wherein initiating display of the graphical user interface in the guided mode includes:
providing an indication of a name of the storage area network management function associated with the list of sequential operations to notify the user of the an ordering of operations that must be performed to execute the storage area network management function.

* * * * *